3,590,026
RECOVERY OF POLYMERS FROM SOLUTION

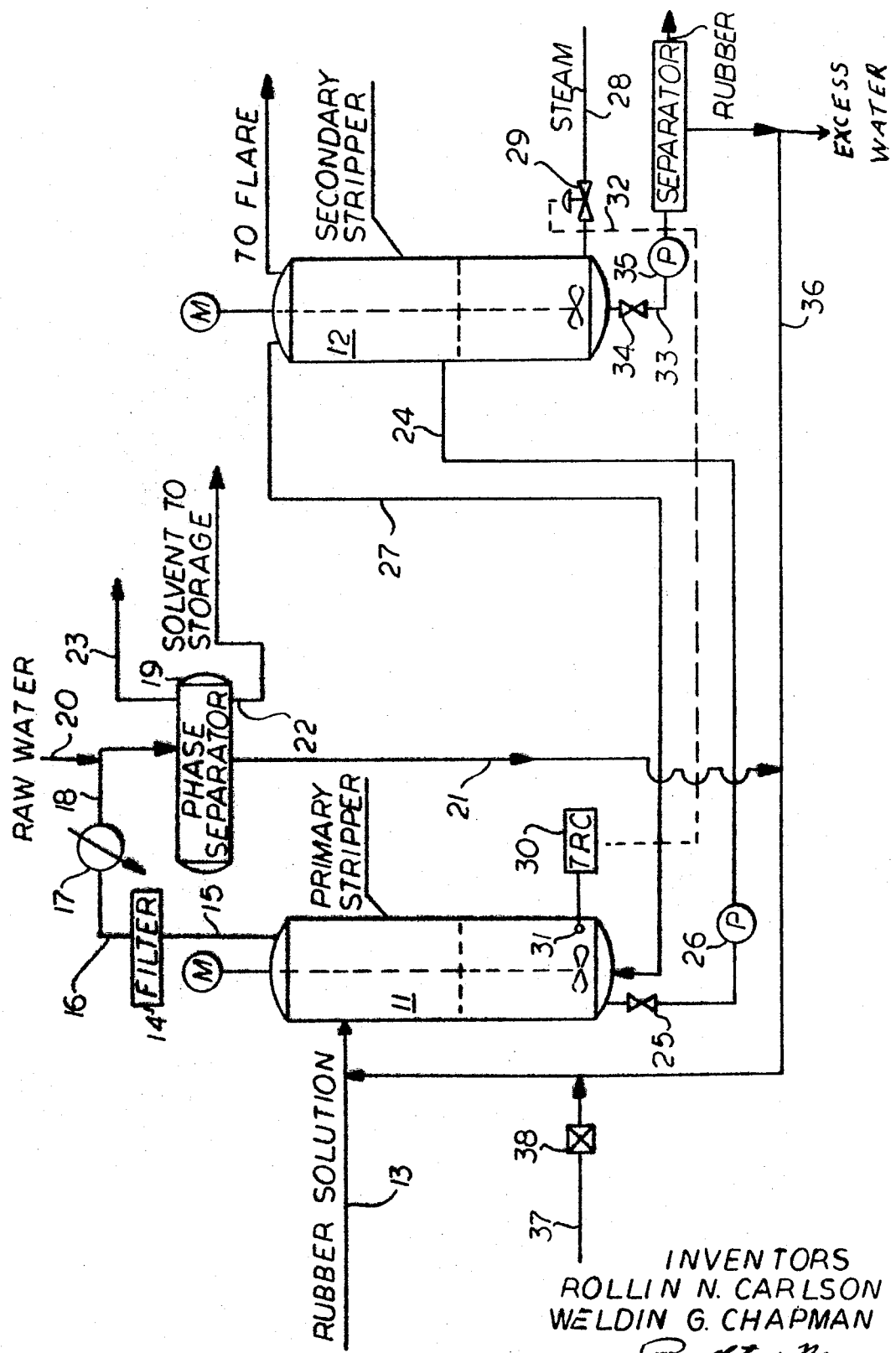

Rollin N. Carlson, Borger, Tex., and Weldin G. Chapman, Bartlesville, Okla., assignor to Phillips Petroleum Company
Filed Jan. 3, 1969, Ser. No. 788,766
Int. Cl. C08d 5/00; C08f 1/92, 1/96
U.S. Cl. 260—94.7                                                      4 Claims

ABSTRACT OF THE DISCLOSURE

Recovery of polymers from solutions thereof in a hydrocarbon solvent by a steam stripping process in which water containing magnesium or calcium ions is employed to increase effectiveness of dispersing agents employed to prevent agglomeration of polymers. The hard water is introduced into the system at a location to accomplish the above object and to provide additional processing advantages.

---

This invention relates to recovery of polymers from solution.

It is known that polymeric materials, including rubbery polymeric materials such as cis-polybutadiene and the like, can be prepared by polymerization of monomers in the presence of organometal initiators. The polymers are recovered as a solution in a hydrocarbon solvent such as toluene. U.S. Pat. No. 3,076,795 relates to recovery of such polymers in crumb form and discloses a steam stripping process and apparatus for the recovery of rubbery polymers from solutions thereof in a hydrocarbon solvent. According to the process described in U.S. Pat. No. 3,076,795, rubbery polymers in crumb form are recovered from hydrocarbon solutions thereof by a process which involves steam stripping of the polymeric solution utilizing two steam stripping zones. In the patented process raw water is introduced into the first or primary stripping zone. The use of water in the process is definitely beneficial, particularly when a dispersant is employed in the recovery process for the purpose of preventing agglomeration of the polymers into a sticky mass rather than a good crumb as is desired. Such dispersants are known to the art and include, for example, zinc oxide, alkali metal lignin sulfonates such as sodium and potassium lignin sulfonates and water soluble saponified polymers of acrylic acid esters. The water which is employed is raw water (hard) containing calcium or magnesium ions which increase the effectiveness of the dispersant in preventing the polymer particles from sticking together. The steam and hydrocarbon solvents from the primary stripping zone are taken off as overhead product and are condensed with the formation of phases to prevent large losses of the hydrocarbon solvent.

It is a principal object of the present invention to provide a process which is an improvement over the recovery process described and claimed in U.S. No. 3,076,795.

In the improved process of the present invention raw (hard) water is not introduced into the primary stripper but instead is introduced into the vessel in which phase separation of the steam and hydrocarbon solvent occurs. By operation in this manner, it has been found unexpectedly that the beneficial results of the hard water are still realized and additional processing advantages achieved, including increase in condensing capacity, reduction in steam requirements for the steam stripping operation, more efficient stripping and increased recovery of hydrocarbon solvent.

The process of this invention is described in detail with reference to the drawing which illustrates apparatus for carrying out the process.

The drawing shows a primary steam stripper 11 and a secondary steam stripper 12, each stripper being provided with a stirring means, but otherwise substantially unobstructed. Rubber solution supply conduit 13 extends to the upper portion of primary steam stripper 11. Filter 14 is provided, this filter being connected to the upper end portion of stripper 11 by conduit 15. Conduit 16 extends from filter 14 to condenser 17 and conduit 18 to phase separator 19. Raw water is introduced into conduit 18 via conduit 20. Phase separator 19 is provided with a water removal conduit 21 by means of which water is returned for use in the process. Conduit 22 is provided for removal of solvent from phase separator 19 and for conducting solvent to storage. Conduit 23 from phase separator 19 extends to a flare (not shown). Conduit 24 extends from the lower end portion of stripper 11 to an intermediate portion of stripper 12, this conduit having valve 25 and pump 26 therein. Conduit 27 extends from the upper end portion of stripper 12 to the lower end portion of stripper 11. Steam supply conduit 28 extends into the lower end portion of stripper 12, this conduit being provided with a motor valve 29 therein. A temperature recorder controller 30 is connected to a temperature sensing means 31 in the lower portion of stripper 11 and the output from controller 30 is operatively connected to motor valve 29 by conduit 32. Conduit 33 having valve 34 and pump 35 therein extends from the lower portion of stripper 12 to a separator. Conduit 36 provides water recycle from the separator to stripper 11. A dispersant is introduced into the recovery system through conduit 37 having valve 38 therein.

In this system, it is possible to recover rubber crumb from various types of rubber in solution. These rubbery polymers are prepared by polymerizing a monomer system containing a single monomer or a mixture containing at least a major portion of conjugated dienes containing 4 to 8 carbon atoms. Examples of conjugated dienes which can be used include 1,3-butadiene, isoprene, 2,3-dimethylbutadiene, 2-methoxybutadiene, 1,3-hexadiene and 1,3-octadiene. These conjugated dienes can be polymerized either alone or in admixture with each other and/or with one or more other compounds containing an active $CH_2\!\!=\!\!C\!<$ group which are copolymerizable therewith. Suitable comonomers containing this group include styrene, acrylonitrile, methyl acrylate, methyl methacrylate, vinyl chloride, methyl vinyl ether, ethylene, propylene, 1-butene, 1-propene, 1-octene and the like. Preferably, at least 70 percent conjugated diene by weight is used in the monomer mixture when copolymers are prepared.

The polymers are prepared in the presence of organic solvents including paraffins, cycloparaffins and aromatic hydrocarbons which are relatively inert, non-deleterious and liquid under the conditions of the process. Examples include the lower molecular weight alkanes, such as propane, butane, pentane, the higher molecular weight paraffins and cycloparaffins, such as isooctane, cyclohexane, methylcyclohexane, and aromatic compounds, such as benzene, toluene and the like.

A large number of initiator systems are suitable for the production of the polymers.

One type of initiator system is a two or more component catalyst wherein one component is an organometal compound, including those where one or more organo groups is replaced by a halogen; a metal hydride; or a metal of Group I, II or III; and the second component is a Group IV to VI compound, e.g., salt or alcoholate. This type of initiator system is fully described with a group of examples in columns 5 through 8 of Pat. No. 2,886,561 dated May 12, 1959.

Another initiator system which is suitable involves the use of a compound of the formula $R(Li)_x$, wherein R is a hydrocarbon radical selected from the group consisting of aliphatic, cycloaliphatic and aromatic radicals and combinations of these radicals and $x$ is an integer from 1 to 4 inclusive. The aliphatic and cycloaliphatic radicals can be saturated or contain olefinic unsaturation. The R in the formul has a valence equal to the integer, and preferably contains from 1 to 20, inclusive, carbon atoms, although it is within the scope of the invention to use higher molecular weight compounds. Examples of these compounds include methyllithium,
isopropyllithium,
n-butyllithium,
tert-octyllithium,
n-decyllithium,
phenyllithium,
naphthyllithium,
4-butylphenyllithium,
p-tolyllithium,
4-phenylbutyllithium,
cyclohexyllithium,
4-butylcyclohexyllithium,
4-cyclohexylbutyllithium,
dilithiomethane,
1,4-dilithiobutane,
1,10-dilithiodecane,
1,20-dilithioeicosane,
1,4-dilithiocyclohexane,
1,4-dilithio-2-butene,
1,8-dilithio-3-decane,
1,4-dilithiobenzene,
1,5-dilithionaphthalene,
1,2-dilithio-1,2-diphenylethane,
9,10-dilithio-9,10-dihydroanthracene,
1,2-dilithio-1,8-diphenyloctane,
1,3,5-trilithiopentane,
1,5,15-trilithioeicosane,
1,3,5-trilithiocyclohexane,
1,2,5-trilithionaphthalene,
1,3,5-trilithioanthracene,
1,3,5,8-tetralithiodecane,
1,5,10,20-tetralithioeicosane,
1,2,4,6-tetralithiocyclohexane,
1,2,3,5-tetralithio-4-hexylanthracene,
1,3-dilithio-4-cyclohexene, and the like.

The amount of organolithium initiator employed can vary over a broad range. In general, the amount of initiator used will be in the range from 0.3 to 100 milliequivalents of lithium per 100 parts by weight of total monomers charged and will preferably be in the range from 0.6 to 15 milliequivalents of lithium per 100 parts by weight of total monomers charged. When n-butyllithium is employed as the initiator for the production of an easily processable 40 to 60 Mooney rubber (ML–4 at 212° F.), the quantity of initiator required will generally be in the range from 2 to 2.4 millimoles per 100 parts of total monomers charged.

Still another initiator system utilizes a cobalt compound and a metal alkyl wherein one but not all of the alkyl groups can be replaced by halogen. The Group III metals, as exemplified by aluminum, are used to provide the metal alkyl component. Examples of these organometal compounds include trialkylaluminums, such as triethylaluminum and triisobutylaluminum and alkyl aluminum halides, such as ethylaluminum dichloride and diethylaluminum chloride. For the cobalt compound, the cobaltous form is preferred. Examples of these compounds include cobaltous chloride, cobaltous sulfate, cobaltous nitrate, and the salts of organic acids, such as cobaltous acetate.

Some of the systems included within the above description of polymers having particular molecular configuration have been found particularly suitable for the production. For instance, polybutadiene having 85 to 100 percent of the polymer formed by cis 1,4-addition can be prepared using initiator systems comprising triisobutylaluminum and titanium tetradiodide; triisobutylaluminum, titanium tetrachloride, and iodine; and triisobutylaluminum, titanium tetraiodide, and titanium tetrachloride. Polybutadiene having 70 to 100 percent of the polymer formed by trans-1,4-addition can be prepared using an initiator system comprising lithium aluminum hydride and titanium tetradiodide. The catalyst system comprising lithium aluminum hydride and titanium tetrachloride produces a polybutadiene having a major amount of the polymer formed by 1,2-addition. Similar products are obtained using isoprene except that a portion of the product can be formed by 3,4-addition.

To determine the amount of the addition of the various types, the polymers can be dissolved in carbon disulfide to form a solution having 20 grams of polymer per liter of solution. The infrared spectrum of such a solution (percent transmission) is then determined in a commercial infrared spectrometer.

The percent of the total unsaturation present as trans-1,4- is calculated according to the following equation and consistent units $$\epsilon = \frac{E}{tc}$$

where: $\epsilon$=extinction coefficient
(liters–mols$^{-1}$–microns$^{-1}$)

E=extinction (log $I_0/I$); $t$=path length (microns); and $c$=concentration (mols double bond/liter). The extinction is determined at the 10.35 micron band and the extinction coefficient used is $1.21 \times 1^{-2}$ (liter–mols$^{-1}$–microns$^{-1}$).

The percent of the total unsaturation present as 1,2- (or vinyl) is calculated according to the above equation, using the 11.0 micron band and an extinction coefficient of $1.52 \times 10^{-2}$ (liters–mols$^{-1}$–microns$^{-1}$).

The percent of the total unsaturation present as cis 1,4- is obtained by subtracting the trans 1,4- and 1,2- (vinyl) determined according to the above methods from the theoretical unsaturation assuming one double bond per each $C_4$ unit in the polymer.

For treatment, it is preferred that the concentration of the polymer in the solvent be in the range of 5 to 10 percent rubber by weight. However, the broader range of 1 to 25 percent rubber is applicable, the higher concentration resulting in greater difficulty in mixing the rubber solution with the water. If effective mixing systems are available, it is quite possible to work with solutions containing 15 percent and higher rubber content.

In carrying out the process of this invention a polymer in a hydrocarbon solvent is introduced into the upper portion of steam stripper 11 by means of conduit 13. Water is also introduced via line 36 into conduit 13 and thence into steam stripper 11. This water comprises water recycled from the separator and also raw make-up water from phase separator 19. The water from phase separator 19 contains magnesium and/or calcium ions which increase the effectiveness of the dispersant which is used in a preferred embodiment of the process and which is introduced through conduit 37. The dispersant can be any of those known to the art as being useful for preventing agglomeration of rubbery polymers; a number of representative dispersants being set forth hereinbefore. Steam stripper 11 can be operated at various temperature and pressure conditions but generally stripper 11 is operated within the range from about 165 to 225° F. and a pressure from about 5 to 25 p.s.i.a., and preferably at a temperature of 180 to 210° F. and a pressure from 10 to 20 p.s.i.a. The overhead vapors from stripper 12 constitute the principal source of heat supplied to stripper 11 and are introduced into stripper 11 through conduit 27 with the input of steam being controlled by temperature recorder controller 30 in conjunction with temperature sensing means 31.

Upon steam stripping in stripper 11 a slurry of polymer and solvent is pumped via line 24 to stripper 12 wherein the secondary steam stripping is carried out. In this two-stage steam stripping process it is preferable to operate the secondary stripper 12 at temperatures and pressures higher than those selected for the primary stripper 11. In general, steam stripper 12 is operated at a temperature of from about 214 to 245° F. and at a pressure of from 1.5 to 5 p.s.i. higher than that selected for stripper 11. Preferred conditions for operation of secondary stripper 12 are temperatures from about 217 to 230° F. and pressures of from 1.5 to 5 p.s.i. higher than the pressure in stripper 11. Steam is supplied to stripper 12 by means of conduit 28. The slurry of polymer in water is recovered from stripper 12 by means of conduit 33 and the polymer separated from the water in the separator and dried by conventional equipment.

The overhead from stripper 11 comprising water and hydrocarbon solvent is passed through filter 14 and via conduit 16 into condenser 17 from which it is conveyed via conduit 18 into phase separator 19. Raw (hard) water is introduced into conduit 18 via line 20. This water is introduced at a relatively low temperature, say on the order of 75° F., and at such a relatively low temperature thus exerts a cooling effect in the phase separator thereby improving the separation of the hydrocarbon solvent which, after separation, is removed via line 22 and conveyed to storage. The water phase (containing hardness ions) resulting in phase separator 19 is recycled by means of line 21.

The following example illustrates operation according to this invention and the advantages thereof.

EXAMPLE

A polymer of cis-polybutadiene is formed by 95 percent of cis 1,4-addition in the presence of an initiator system comprising triisobutylaluminum, titanium tetrachloride, and titanium tetraiodide. Rosin acid is used to shortstop the polymerization and 2,2'-methylene bis(2-methyl-6-tertiarybutylphenol) is added as an antioxidant.

A solution of the cis-polybutadiene (15% by weight) in toluene is treated according to the process of this invention. Thus, the polymer in hydrocarbon solution is introduced through line 13 into stripper 11 at a rate of 900 pounds per minute. Stripper 11 is operated at a temperature of approximately 206° F. and a pressure of 4 p.s.i.g. Three gallons per minute of a dispersant (sodium salt of a copolymer of diisobutylene and maleic anhydride) is introduced through conduit 37 and into line 13. A slurry of polymer in solvent is withdrawn from the bottom of stripper 11 and passed via line 24 to secondary stripper 12 which is operated at a pressure of approximately 220° F. Steam is introduced into stripper 12 through line 28 at a rate of about 700 pounds per minute and a pressure of 150 p.s.i.g. The polymer in water is removed from stripper 12 through line 33 and separated in the separator and then dried. Water from the separator at a temperature of approximately 175° F. is recycled through line 36. The overhead from steam stripper 11 comprising water and toluene vapors in a ratio of about 40:60 is passed through condenser 17 and then through line 18 into the phase separator 19. Raw water containing hardness ions is introduced through line 20 into conduit 18 at a temperature of approximately 75° F. and at a rate of approximately 320 pounds per minute. The temperature within the phase separator 19 is approximately 175° F. By introducing water at a temperature of 75° F. into the phase separator, a cooling or condensing effect calculated to be equivalent to about 4.1 million B.t.u. per hour is achieved and results in a calculated additional recovery or condensation of 10,320 pounds per hour of toluene. In contrast, if the raw water were to be introduced directly into steam stripper 11 at the same temperature and rate an additional calculated heating load of 4.1 million B.t.u. per hour would be required necessitating the use of over 4,000 pounds additional steam per hour in stripper 11 to maintain the same conditions therein. The water from phase separator 19 is recycled at a temperature of approximately 175° F.

Those modifications and equivalents which fall within the spirit of the invention are to be considered a part thereof.

We claim:

1. A process for recovering a rubbery polymer or copolymer of a conjugated diene containing 4 to 8 carbon atoms from a solution of said polymer or copolymer in a solvent comprising introducing said solution into a first substantially unobstructed stripping zone, supplying heat to said first stripping zone as hereinafter described, removing a mixture of solvent and water as an overhead product of said first stripping zone, condensing said overhead product and passing the condensate to a phase separation zone, introducing into the phase separation zone hard water containing magnesium and/or calcium ions at a temperature substantially lower than the temperature of said condensate, passing water from said phase separation zone to said first stripping zone, removing a mixture of rubber crumb, solvent, and water as a bottom product of said first stripping zone, passing said bottom product to a second substantially unobstructed stripping zone, removing an overhead vapor product from said stripping zone and passing same to said first stripping zone, said vapor product being the principal source of heat supplied to said first stripping zone, heating said second stripping zone by supplying steam thereto in an amount sufficient to maintain a predetermined temperature in said first stripping zone, removing a slurry of rubber crumb in water from the bottom portion of said second stripping zone, and separating water from said crumb.

2. The method of claim 1 wherein said first stripping zone is operated at a temperature of from about 165 to 225° F. with a pressure of 5 to 25 p.s.i.a. and the said second stripping zone is operated at a temperature of from about 214 to 245° F. with a pressure 1.5 to 5 p.s.i. higher than that used in said first stripping zone.

3. The method of claim 1 wherein said first stripping zone is operated at a temperature of from about 180 to 210° F. with a pressure of 10 to 20 p.s.i.a and the said second stripping zone is operated at a temperature of from about 217 to 230° F. with a pressure 1.5 to 5 p.s.i. higher than that used in said first stripping zone.

4. A process for recovering cis-polybutadiene from a solution thereof in toluene comprising introducing said solution into a first stripping zone operated at a temperature of 165 to 225° F. with a pressure of 5 to 25 p.s.i.a.; supplying heat to said first stripping zone as hereinafter described; removing a mixture of toluene and water as an overhead product of said first stripping zone; condensing said overhead product and passing the condensate to a phase separation zone, introducing into the phase separation zone hard water containing magnesium and/or calcium hardness ions at a temperature of about 75° F., passing water from said phase separation zone to said first stripping zone, removing a mixture of rubber crumb, toluene, and water as a bottom product of said first stripping zone; passing said bottom product to a second substantially unobstructed stripping zone operated at a temperature of 214 to 245° F. with a pressure 1.5 to 5 p.s.i. higher than that used in said first stripping zone; removing an overhead vapor product from said second stripping zone and passing same to said first stripping zone, said vapor product being the principal source of heat supplied to said first stripping zone; heating said second stripping zone by supplying steam thereto in an amount sufficient to maintain a predetermined temperature in said first stripping zone; removing a slurry of rubber crumb in water from the bottom portion of said second stripping zone; and separating water from said crumb.

References Cited

UNITED STATES PATENTS

| | | | |
|---|---|---|---|
| 3,076,795 | 2/1963 | Hall | 260—94.7 |
| 3,250,313 | 5/1966 | Irvin | 260—94.7X |

JOSEPH L. SCHOFER, Primary Examiner

W. F. HAMROCK, Assistant Examiner

U.S. Cl. X.R.

260—82.1, 83.3, 83.5, 85.1, 85.3, 96